Sept. 9, 1969  A. KIRPICH  3,465,594

PORTS FOR PRESSURE MEASUREMENTS ON ABLATING SURFACES

Filed Nov. 5, 1965

INVENTOR.
AARON KIRPICH
BY *Harry A. Herbert Jr*
*Ruth Codier*
ATTORNEYS

United States Patent Office 3,465,594
Patented Sept. 9, 1969

3,465,594
PORTS FOR PRESSURE MEASUREMENTS ON ABLATING SURFACES
Aaron Kirpich, Broomall, Pa., assignor to the United States of America as represented by the Secretary of the Air Force
Filed Nov. 5, 1965, Ser. No. 506,917
Int. Cl. G01l 7/00
U.S. Cl. 73—388                                   7 Claims

ABSTRACT OF THE DISCLOSURE

Thin wafers or discs of material of high ablation resistance are stacked in a counter-bored hole adjacent the surface of a body whose surface pressure is to be measured. The surface pressure is transmitted through an opening through the center of the stack, and is transmitted to measuring instruments located inside the body.

---

The invention relates to ports for pressure measurements on ablating surfaces, and more particularly to the formation and design of passageways for transmitting static pressure from the surface of bodies subjected to high heat fluxes to pressure transducers located in the interior of the body.

The measurement of an aerodynamic static pressure adjacent to the surface of a particular shape is conventionally obtained with the use of a small hole drilled perpendicularly to the surface. This passage is directed to some form of transducer located within the body for receiving the pressure signal. This method presupposes that the hole opening retains a sharp, well-defined edge. In practice this method fails in accuracy. The conditions present are extremely high temperatures and pressures, and failure results from the following possible conditions; (1) the plugging of the passage to the transducer by molten products of ablation, and (2) the distortion of the well-defined edge of the hole by crumbling and erosion of the material of the aerodynamic body, thereby interfering with the accuracy of the pressure reading.

The object of the present invention is to produce a port design which will obviate the above noted difficulties and render possible more uniform and more accurate surface pressure determination. To accomplish this purpose a port must be provided which presents at all times a well-defined and unobstructed opening while the surface around it is melting and eroding. Thin wafers or discs of material of high ablation resistance are stacked in a counter-bored hole adjacent the surface along which static pressure is to be measured. The discs have centrally located openings or a hole is drilled through the center of the stacked discs to provide a passageway from the surface to a pressure transducer. As ablation, erosion, melting and crumbling of the bulk material of the body proceeds, individual discs are sloughed off, exposing a sharp clean hole through which surface pressure conditions are accurately transmitted.

Graphite has been found effective for two reasons. First its ablation resistance resistance is high, and second, the lubricating property possessed by graphite prevents adherence of molten ablation products to the local graphite area surrounding the hole. That is, the molten material is sloughed off and clogging of the hole is thus prevented. The superior resistance of graphite to ablation as compared to the bulk material surrounding it would insure a definite step-by-step sloughing of the discs, helping to prevent the gouging out of the body material, as would be the case where no lining material were present or if material of poorer ablation resistance were used. Should the hole become partially plugged, the eventual sloughing of the partially plugged disc will expose a clear passageway underneath.

These and other advantages, features and objects of the invention will become more apparent from the following description taken in connection with the illustrative embodiments in the accompanying drawings, wherein.

Figure 1:
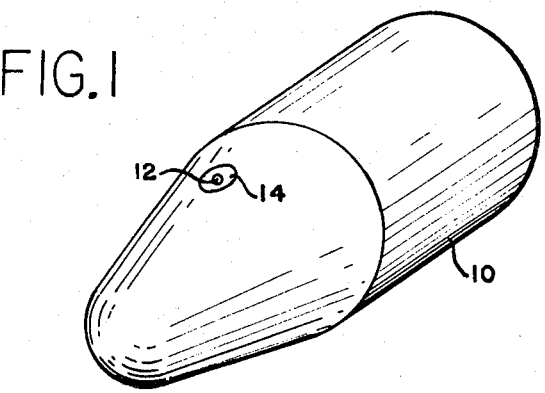
FIGURE 1 is a perspective view of an ablation type model comprising a 9° coned sphere.

Referring more in detail to the drawing, a body member 10 is representative of the ablation type model subjected to high heat and high pressure conditions such as are to be found in areas exposed to rocket fire. An opening, port, or passageway 12 is shown on the surface of the body member 10, to provide means for communicating surface conditions to pressure sensing devices. These ports are subject to clogging due to the erosion and melting of the surface of the body. To prevent this clogging condition, the port or opening 12 is lined with a series of stacked discs 14. Graphite has been chosen because of its superior ablation resistance characteristic and because of its lubricating property. It is conceivable, however, that other materials having the required properties can be used.

Figure 7:
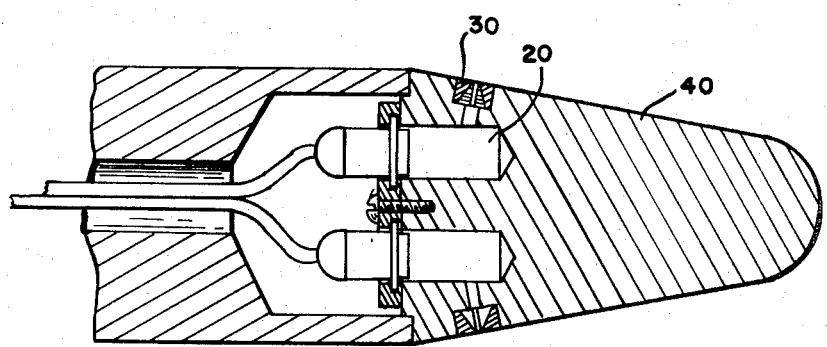
FIGURE 7 is a cross-sectional view of an ablation type model such as shown in FIGURE 1 and showing a pair of passageways leading each to a pressure transducer.

The dimensions of the graphite discs are of the order of ⅜ inch diameter and .010 inch in thickness. The discs may be washers having centrally mating openings or the the port 12 may be constructed by boring an opening through the cylinder of stacked graphite discs 14. For purposes of comparison, experiments were conducted with closed bores such as are shown at 16 in FIGURE 3, and with open bores 18 shown in FIGURE 2 leading directly from the body surface to some sort of pressure sensing device such as the transducers 20 shown in FIGURE 7.

Figure 3:
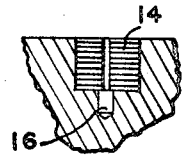
FIGURE 3 is a cross section of a closed ended port showing the passageway lined with graphite discs.
Figure 2:
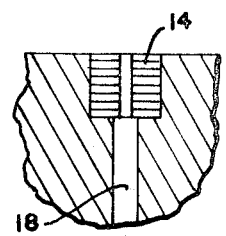
FIGURE 2 is a cross section of a passageway lined with graphite discs and mounted in the opening of the ablation type element of FIGURE 1.

Various designs for the linings of the passageways have been contrived. In FIGURES 2 and 3, a single stack of graphite discs 14 are placed in surface counter-bores.

Figure 5:
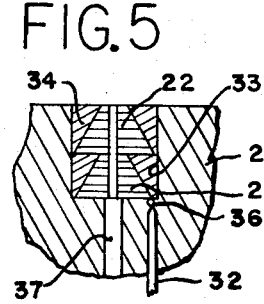
FIGURE 5 is a cross section taken substantially on the line 5—5 of FIGURE 4.
Figure 4:
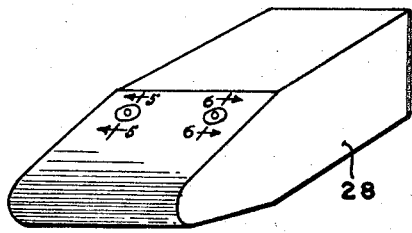
FIGURE 4 is a perspective view of an ablation type model in the form of a radiused wedge having four ports on its ablating surfaces.
Figure 6:
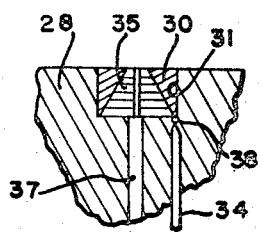
FIGURE 6 is a cross-sectional view taken substantially on the line 6—6 of FIGURE 4.

In FIGURES 4, 5 and 6 a radiused wedge ablation type model 28 is provided with ports having graphite linings which are circumferentially surrounded by a bushing of ablating material. These ports are designed in two different ways.

In FIGURE 6 a single ring 30 of ablating material provides a lining for the bore 31 and tapers from the base of the bore to accommodate a complementary coned stack of discs 35 increasing in diameter from the surface inward.

In FIGURE 5 a double cone is devised wherein two series of washers or discs 22—24 of inwardly increasing size are superimposed along the length of the passageway. These laminated cones are "locked" in by a surrounding bushing 34 of material whose ablation resistance is less than that of the graphite or other material which comprises the wall of the passageways 37. The sloughing off of the discs of each laminated cone is deterred or slowed down.

Thermocouples 36 and 38 may be located underneath the graphite stacks so that the temperature as well as the surface pressure may be measured.

Body materials may be phenolic glass or the like, and the plugs and bushings may be phenolic refrasil materials such as fibrous silica of high purity $SiO_2$ which can withstand extremely high temperatures and are useful as thermal insulation in conditions such as are encountered in jet aircraft, tail cones and pipes.

The sensing devices used may be of the strain type pressure pickups as Model 4–312 of Consolidated Electrodynamics Corporation. These pressure pickups may be fed to oscillograph devices.

It will now be seen that the static pressure present at the surface of the bodies 10, 28 and 40 can be transmitted to internally located sensing means and measured with a great degree of accuracy since the stacked graphite wafers slough off as the ablating surface of the body wears away. The graphite lining, which withstands higher temperatures than the surrounding ablating surface, wear away and slough off as the surrounding surface wears, thus preventing clogging and keeping the opening free and unobstructed.

I claim:

1. A device for pressure measurements on ablating surfaces of bodies subjected to high heat fluxes, said device comprising a body, pressure sensing means located in the interior of said body, said body being provided with a bore from said pressure sensing means to the surface of said body, a laminated element located in said bore, said laminated element having a central opening therethrough to provide a passageway from the surface of said body to said pressure sensing means, said laminated element being of higher ablation resistance than the material of said body.

2. A device for pressure measurements at ablating surfaces of bodies subjected to high heat fluxes, said device comprising pressure sensing means located in the interior of a body, means for providing sensing communication from said sensing means to the surface or said body, said means comprising a passageway, a laminated bushing element in said passageway, said lamnted bushing element comprising a plurality of stacked graphite discs.

3. A device according to claim 2 wherein said laminated bushing element is cone shaped and wherein the diameters of the stacked graphite discs increases from the surface of said body inwardly.

4. A device for augmenting the accurate measurement of surface pressures on bodies subjected to high heat fluxes, said device comprising a passageway for providing transmission of unchanged pressure states from the surface of a body to sensing means located in the interior thereof, a double lining for said passageway, one element of said double lining comprising a gasket of ablating material having a central bore tapered toward the surface of said body, the second element comprising a gasket, conical in shape, and fitting within said tapered bore, said gasket being formed of stacked graphite wafers of diameters increasing from the surface of said body toward its interior.

5. A device for allowing accurate and unmodified transmission of surface pressures from the ablating surfaces of bodies subjected to high heat fluxes to sensing means located in the interior of said bodies for measurement of said pressures, said device comprising a port in said body from the surface thereof to said sensing means, means for maintaining said port free from obstruction by the molten ablating materials of said body, said means comprising a double lining for said port, one element of said lining comprising a cone shaped stack of laminated material of high ablation resistance, the second element comprising a locking gasket of ablating material surrounding said stack.

6. A port for transmission of surface pressure conditions present at the ablating surfaces of bodies subjected to high temperatures and pressures to pressure sensing means located in the interior of said bodies for accurate measurement of surface pressures, and means for maintaining said port in open condition and free from molten ablating materials, said means comprising a cone of graphite discs providing a lining for said port and a locking gasket of ablating material surrounding said cone.

7. A port for the transmission of surface pressures of ablating bodies to pressure sensing means located in the interior of said bodies, and means for maintaining said ports open and free from molten ablating materials, said means comprising at least two gaskets superimposed on each other along the length of said port, each gasket comprising a laminated cone shaped stack of discs of ablation resisting material and an element circumferentially surrounding said stack, said element being made of ablating material to provide a partial deterrent for sloughing off of the discs of said laminated cone.

References Cited

UNITED STATES PATENTS

| | | | |
|---|---|---|---|
| 3,114,319 | 12/1963 | Smith | 102—92.5 |
| 3,270,503 | 9/1966 | Meyer | 102—92.5 X |

VERLIN R. PENDEGRASS, Primary Examiner